United States Patent
Kim et al.

(10) Patent No.: US 8,151,775 B2
(45) Date of Patent: Apr. 10, 2012

(54) HIGH VACUUM CRANKCASE VENTILATION

(75) Inventors: Changsoo Kim, Bloomfield Hills, MI (US); Gregory F. O'Daniel, Davisburg, MI (US); Steven E. Ives, Durand, MI (US); Ellen Shirley Schwartz, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 748 days.

(21) Appl. No.: 12/249,656

(22) Filed: Oct. 10, 2008

(65) Prior Publication Data

US 2010/0089345 A1 Apr. 15, 2010

(51) Int. Cl.
*F02B 25/06* (2006.01)
(52) U.S. Cl. .................. 123/572; 123/574; 123/41.86
(58) Field of Classification Search ............... 123/572, 123/574, 41.86
See application file for complete search history.

(56) References Cited

U.S. PATENT DOCUMENTS

| | | | | |
|---|---|---|---|---|
| 3,340,899 A | * | 9/1967 | Welty et al. | 138/43 |
| 5,586,541 A | * | 12/1996 | Tsai | 123/574 |
| 6,475,255 B1 | * | 11/2002 | Walker, Jr. | 55/315 |
| 6,807,958 B2 | * | 10/2004 | Kabat et al. | 123/574 |
| 7,017,564 B2 | * | 3/2006 | Duprez et al. | 123/574 |
| 7,316,227 B2 | * | 1/2008 | Zhao et al. | 123/574 |
| 2004/0112346 A1 | * | 6/2004 | Ahlborn et al. | 123/572 |
| 2006/0272740 A1 | * | 12/2006 | Poulter | 141/231 |
| 2007/0028904 A1 | * | 2/2007 | Duprez | 123/574 |
| 2008/0295814 A1 | * | 12/2008 | Breuninger et al. | 123/572 |

* cited by examiner

*Primary Examiner* — Marguerite McMahon
*Assistant Examiner* — James Kim (57) ABSTRACT

A combustion engine is configured to substantially reduced pressure in the crankcase relative to atmospheric conditions. Under the conditions of reduced pressure, removal of contaminants present in the lubricating oil present is effected, which may provide one or more benefits including extended service intervals, reduced volumes of motor oils used, and lessened wear of internal engine components.

13 Claims, 4 Drawing Sheets

HIGH VACUUM CRANKCASE VENTILATION

TECHNICAL FIELD

This disclosure relates to systems and methods for extending the useful service life of internal combustion engine lubricating oils.

BACKGROUND

Lubricating oil compositions are employed in internal combustion engines. Various improvements have been made to lubricating oils intended for service in internal combustion engines, including the addition of various additive packages to base oils, the additive packages typically comprising one or more hydrocarbon-soluble ashless dispersants, corrosion inhibitors, anti-oxidants, friction modifiers, overbased sulfonate detergents, and anti-wear agents such as zinc dialkyldithiophosphates (ZDDP). The development of modern additive packages have significantly lengthened the service life of lubricating oils intended for service in internal combustion engines.

SUMMARY

A combustion engine is configured for positive crankcase ventilation including a crankcase headspace and an intake plenum. The crankcase headspace is fluidly coupled to atmospheric pressure through a first conduit and fluidly coupled to an intake plenum through a second conduit. A flow restriction within the first conduit effectively restricts the draw of fresh air therethrough into the crankcase headspace during engine operation sufficiently to establish a high vacuum condition within the crankcase headspace.

BRIEF DESCRIPTION OF THE DRAWINGS

One or more embodiments will now be described, by way of example, with reference to the accompanying drawings, in which.

DETAILED DESCRIPTION

Figure 1:
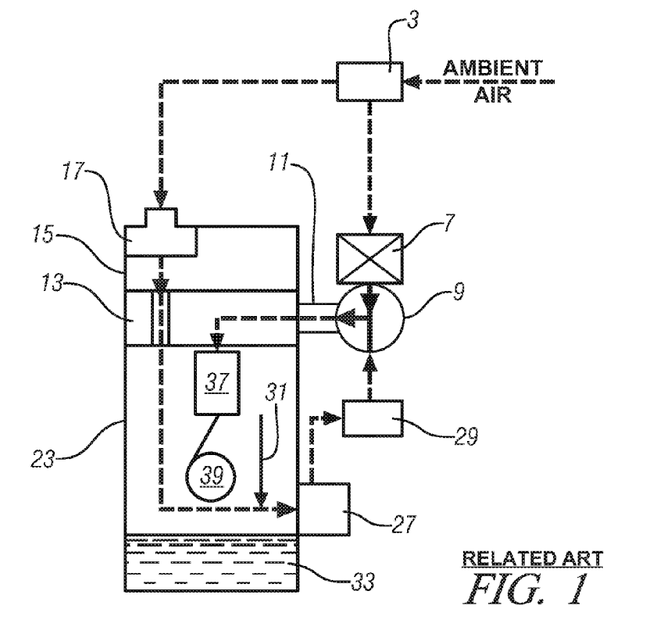
FIG. 1 shows a schematic diagram of a known engine crankcase ventilation system.

Referring to the drawings and initially to FIG. 1, there is shown a schematic diagram of a known crankcase ventilation system. As is known in the art, during the normal operation of a combustion engine a region of reduced pressure with respect to ambient conditions, i.e., a vacuum, is typically developed in a portion of the intake manifold, including within the intake runners, as a result of the intake stroke of each piston, or movement of a rotor in engines so equipped. In the crankcase ventilation scheme depicted in FIG. 1, this vacuum is advantageously used to evacuate gases present in the headspace above the lubricating oil 33 that resides in the engine crankcase 23, and to convey such gases to the combustion chamber, whereby their combustible constituents are burned. During operation of the engine represented in FIG. 1, a first stream of ambient air is drawn through an air filter 3 and then passes through an air/oil separator 17 which typically comprises one or more baffles, as is known in the art. This filtered air is further drawn through the valve cover/camshaft(s) cover 15, through an open passage cast-in in the cylinder head 13, and into the headspace above the lubricating oil 33. The air drawn into the headspace in this manner is met with substantially negligible restriction to flow, thus effectively opening the crankcase to atmospheric pressure conditions. In this headspace area, the first stream of filtered ambient air becomes admixed with blow-by gases 31 which are also present in the headspace above the lubricating oil, partially by the action of the reciprocating assembly that includes the rotating crankshaft 39 and one or more pistons 37. This mixture of filtered ambient air and crankcase blow-by gases is drawn through an air/oil separator 27 typically comprising one or more baffles as such are known in the art, through a positive crankcase ventilation ("PCV") regulator valve 29, and into the intake plenum 9. A second stream of filtered ambient air is also drawn into the intake plenum 9 through a throttle body 7, which often comprises the butterfly valves on a carburetor, throttle-body injection system, or the butterfly valves on a stand-alone throttle body unit, as these are well-known in the art. The second stream of filtered ambient air and the mixture of blow-by gases and the first stream of filtered ambient air are mixed, more or less, in the intake plenum 9 or one or more intake runners 11, admitted into the combustion chamber with a metered amount of fuel, and consumed in the combustion process. The crankcase pressure levels present in known internal combustion engines as described above typically vary from a slight pressure over atmospheric pressure to a slight vacuum. When measured relative to one standard atmosphere (i.e. 101 kPa), such crankcase pressure levels are in the range of between about 102 to 98.5 kPa, varying uncontrollably in response to ambient conditions and engine economy as these inherently fluctuate. High vacuum levels associated with the intake plenum are purposely prevented from occurring in the crankcase headspace by flow restriction of the PCV valve or an orifice restricting the draw, in combination with the substantially negligible flow restriction between the crankcase headspace and atmospheric pressure conditions.

Figure 2:
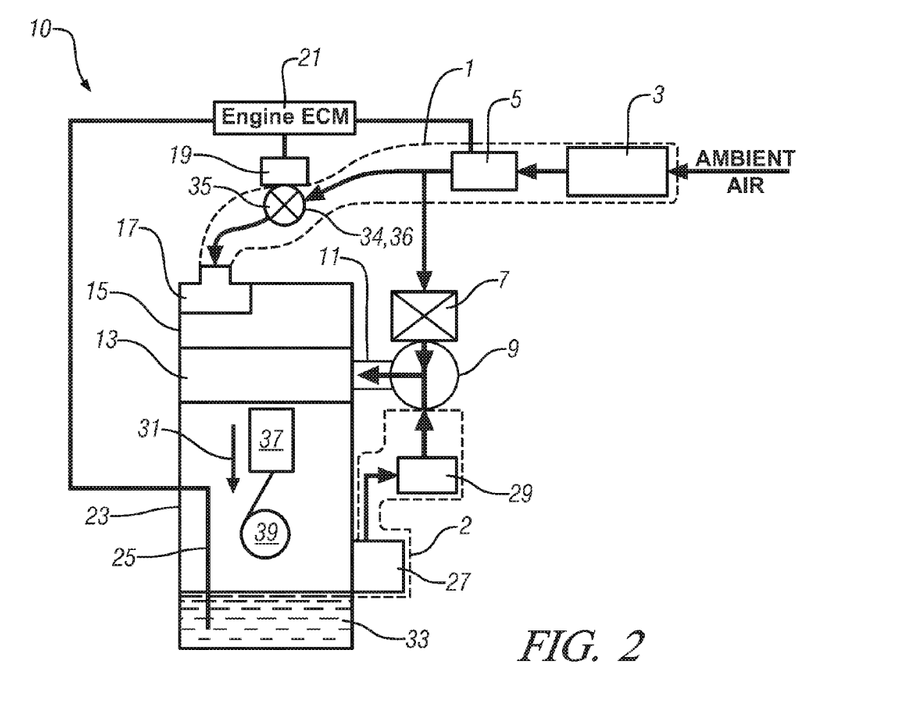
FIG. 2 shows a schematic diagram of an exemplary engine crankcase ventilation system according to at least one embodiment of the instant disclosure.

FIG. 2 is a schematic diagram of an engine crankcase ventilation system 10 according to one embodiment of this disclosure. In this embodiment, ambient air is drawn through an air filter 3 and then passes through an optional mass flow sensor 5, which may be a vane meter sensor, a hot wire sensor (MAF), a coldwire sensor, a membrane sensor, a laminar flow element or any other known device for measuring airflow that is capable of outputting a voltage or changing in electrical resistance in relation to airflow. The mass flow sensor 5, when present, is in electronic contact with and provides information to the engine's electronic control module ("ECM") 21, which information may then be used to calculate appropriate quantities of fuel for delivery to the intake manifold or fuel injectors (not shown).

On the engine side of the mass flow sensor 5, a first stream of filtered ambient air is drawn through a control valve 35, which control valve is controlled by an actuator 19, which may comprise a solenoid or other functionally-equivalent means known to those skilled in the art for switching a valve from one position to another, which actuator is itself controlled by the engine's ECM 21. Once the first stream of filtered ambient air has been drawn through the control valve 35, it is subsequently drawn through air/oil separator 17, through the valve cover/camshaft(s) cover 15, through one or more open passages cast-in the cylinder head 13, and into the headspace above the lubricating oil 33 to provide a mixture of filtered ambient air and crankcase blow-by gases. Thus, said crankcase headspace 23 is fluidly coupled to atmospheric pressure through a first conduit 1. This mixture of filtered ambient air and crankcase blow-by gases is then drawn through an air/oil separator 27, through a PCV regulator valve 29, and into the intake plenum 9. A second stream of filtered ambient air is also drawn into the intake plenum 9 through throttle body 7, and becomes mixed, more or less, with the mixture of blow-by gases and the first stream of filtered ambient air in the intake plenum 9 and/or one or more intake runners 11, is admitted into the combustion chamber with a metered amount of fuel, and consumed in the combustion process.

In the embodiment shown in FIG. 2, there is also a temperature sensor 25 provided to be in sufficient contact with the lubricating oil 33 that is disposed in the crankcase for providing data from which the temperature of the lubricating oil 33 may be determined in real time. The temperature sensor 25, for example a thermocouple, is in electronic contact with and provides information to the engine's ECM.

The foregoing structure is capable of advantageously and controllably providing a relatively high vacuum condition to exist in the crankcase, i.e., in the headspace above the lubricating oil 33, in response to engine operating conditions. High vacuum conditions in the crankcase headspace as used herein is understood to mean vacuum levels which exceed those established during equivalent engine operation with substantially negligible restriction to flow of air into the crankcase headspace from atmospheric pressure conditions. More particularly, high vacuum conditions in the crankcase headspace as used herein is understood to mean vacuum levels below atmospheric pressure conditions by substantially 3 kPa or more. Use of a system which comprises at the least the fewest number of components described above suitable for advantageously and selectively achieving such a relatively high vacuum in the headspace above the lubricating oil 33 can prolong the useful service life of the lubricating oil 33. Other additional or optional components and systems known to those skilled in the art may also be present on an engine or system according to this disclosure.

In one embodiment, the control valve 35 is a three-way valve, having two possible positions, wherein each of the two possible positions of the three-way valve provide an opening of different size through which a stream of filtered ambient air may be selectively drawn. In a first operating mode, when the sensed lubricating oil temperature is below a first threshold level, which in one embodiment is about 50° C., filtered ambient air is drawn through the control valve 35 (and ultimately to the crankcase and plenum) through a first orifice 34 in the control valve 35 having a first internal diameter, which in one embodiment is a diameter of about one millimeter, for an engine having any displacement in the range of between about 1.5 liters and 6.0 liters. The interior of the sealed crankcase 23, being connected to the intake plenum 9 through suitable plumbing, tubing or conduits which may include an air/oil separator 27 and a PCV regulator valve 29, is then caused to exist in condition of relatively greatly reduced pressure with respect to ambient conditions by virtue of the reduced pressure present within the plenum 9 (relative to ambient pressure), which is preferably any level of pressure between about 50 kilopascals (kPa) to about 100 kPa, including all pressures and ranges of pressures therebetween. Thus, the air/oil separator 29 and the PCV regulator valve 29 are included within a second conduit 2 between the crankcase 23 and the intake plenum 9. Although described in one embodiment as having an inner diameter of about one millimeters, the first orifice 34 in the control valve 35 may have any diameter between about 0.2 millimeters and about five millimeters.

Volatile contaminants present in the lubricating oil 33 typically have a vapor pressure. These contaminants result from "blow-by" gases, as such are well-known in the art, which are materials which pass between the cylinder walls and piston rings during engine operation and may include: 1) water; 2) oxides of nitrogen; 3) oxides of sulfur; 4) aqueous oxyacids of nitrogen; 5) aqueous oxyacids of sulfur; 6) carbon dioxide; 7) carbonic acid; 8) unburned fuel; and 9) addition products or adducts of any of the foregoing with a component of the additive package present in the lubricating oil. Additionally, water is known to be present in the crankcase from condensation caused by variances in ambient temperature and the repeated cyclings on and off of an in-service engine.

When the pressure in the crankcase is reduced in accordance with this disclosure, the vapor pressure of one or more volatile contaminants present in the crankcase or the lubricating oil 33 itself is caused to accordingly be closer to, if not in excess of, the point at which one or more of the volatile components will readily vaporize, or even boil. In any event, the volatility of the contaminants is effectively increased by the reduced pressure existing in the crankcase when operating according to this disclosure. This translates to enhanced volatility of contaminants, which are then evacuated from the crankcase to the intake plenum by the flow of filtered ambient air through the crankcase in accordance herewith. Over the long term, increased removal of such volatile contaminants by their volatilization in accordance with this disclosure provides increased lubricating oil service life and extended service intervals. Such removal preserves the anti-oxidants present in crankcase oils, maintaining lubricity over longer periods of time. The presence of water in crankcase oil is known to increase the rate of corrosion and wear of engine lubrication parts such as engine cylinder walls, piston rings, camshaft journals and lobes, lifters, and other components. The corrosion and wear is accelerated when acids from combustion, including nitric and nitrous acids, as well as acids from engine oil oxidation, including carboxylic acids, are dissolved in the water. Water is known to act as a collector of such acids. The removal of unburned fuel from the crankcase oil also results in increased lubricity over time, and has the added benefit of reducing internal friction present in the engine's reciprocating assembly, which translates to increased fuel economy and horsepower output. These benefits are especially present for automobiles and trucks which are frequently operated under short-trip conditions in cooler climates, according to this disclosure. Moreover, increased engine oil service life can be equated with reduced wear and corrosion of internal engine components; thus, an engine system operated in accordance with this disclosure will enjoy longer useful service life between rebuilds versus engines operated according to known crankcase ventilation systems as further demonstrated herein below.

In a second operating mode, after the sensed lubricating oil temperature is above a first threshold level, which in one embodiment is about 50° C., the ECM causes the actuator 19 to change the position of the control valve 35 so that filtered ambient air is drawn through the control valve 35 (and ultimately to the crankcase and plenum) through a second orifice 36 in the control valve 35 having a second internal diameter, which in one embodiment is a diameter of about three millimeters, for an engine having any displacement in the range of between about 1.5 liters and 6.0 liters. The interior of the sealed crankcase 23, being connected to the intake plenum 9 through suitable plumbing, tubing or conduits which may include an air/oil separator 27 and a PCV regulator valve 29, is then caused to remain in a condition of greatly reduced pressure with respect to ambient conditions by virtue of the reduced pressure (relative to ambient pressure) present within the plenum 9; however, the level of pressure in the crankcase when the engine is operated in this second mode of operation is generally greater than is present in the crankcase when the same engine is operating according to the first mode of operation described herein. The degree of pressure present in the crankcase when the engine is operated according to the second mode of operation may be any level of pressure between about 50 kilopascals (kPa) to about 100 kPa, absolute, including all pressures and ranges of pressures therebetween. Although described in one embodiment as having an inner diameter of about three millimeters, the second orifice 36 in the control valve 35 may have any diameter between about two and eight millimeters, subject to the proviso that the diameters of the first orifice 34 and second orifice 36 of the control valve 35 are not substantially identical. In one embodiment of the disclosure, the default position of the control valve 35 is set at the ECM to enable air to be drawn through the first orifice 34 of the control valve 35. In another embodiment, the default position of the control valve 35 is set at the ECM to enable air to be drawn through the second orifice 36 of the control valve 35.

In an alternate embodiment, a two orifice valve providing different flow restrictions may take the form of a valve whose orifice selection is responsive to engine heating in a manner similar to an engine coolant thermostat using, for example, a bimetallic actuation mechanism. In other words, a two orifice valve may selectively effect a first flow restriction prior to the engine reaching a predetermined operating temperature whereafter the bimetallic mechanism selectively effects a second, less restrictive flow restriction.

Figure 3:
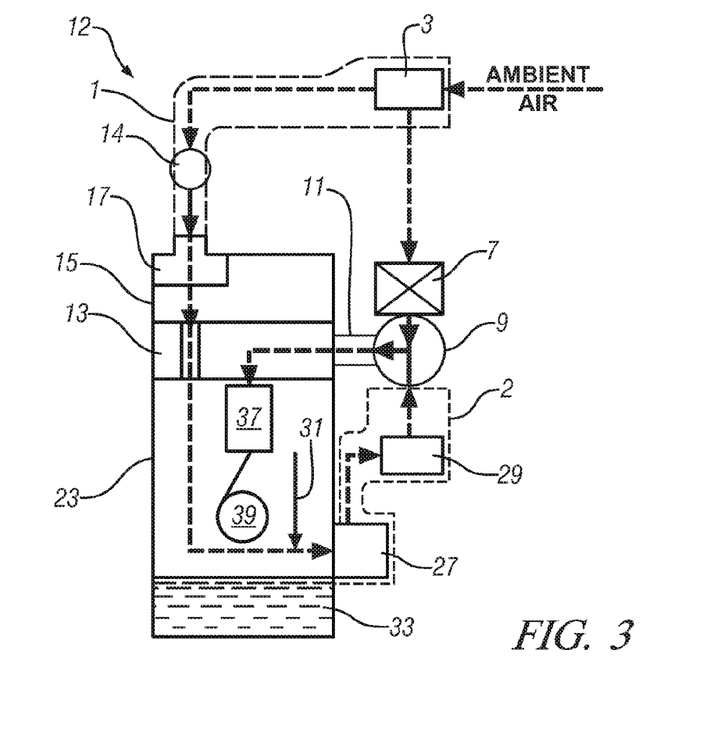
FIG. 3 shows a schematic diagram of an exemplary engine crankcase ventilation system according to at least one alternate embodiment of this disclosure.

In FIG. 3 there is shown a schematic diagram of an engine crankcase ventilation system 12 according to an alternate embodiment of the disclosure. In this embodiment, a first stream of ambient air is drawn through an air filter 3 and then passes through a check valve 14 having an orifice (FIG. 4), before being admitted to air/oil separator 17. This filtered air is further drawn through the valve cover / camshaft(s) cover 15, through one or more open passages cast-in to the cylinder head 13, and into the headspace above the lubricating oil 33. In this headspace area, the first stream of filtered ambient air becomes admixed with blow-by gases 31 which are also present in the headspace above the lubricating oil. Thus, said crankcase headspace 23 is fluidly coupled to atmospheric pressure through a first conduit 1. This mixture of filtered ambient air and crankcase blow-by gases is then drawn through an air/oil separator 27, through a PCV regulator valve 29, and into the intake plenum 9. A second stream of filtered ambient air is also drawn into the intake plenum 9 through a throttle body 7. The second stream of filtered ambient air and the mixture of blow-by gases and the first stream of filtered ambient air are mixed, more or less, in the intake plenum 9 or one or more intake runners 11, admitted into the combustion chamber with a metered amount of fuel, and consumed in the combustion process.

Figure 4:
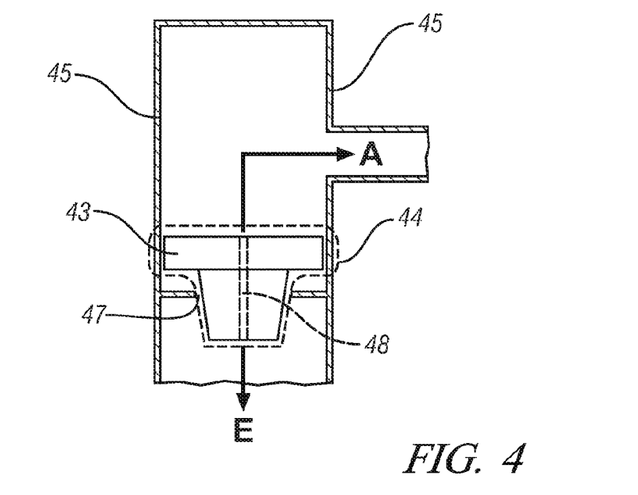
FIG. 4 shows a cross-sectional view of a check valve useful in accordance with at least one embodiment of this disclosure.

One suitable embodiment of a check valve 14 useful in accordance with this disclosure is depicted in cross-section in FIG. 4. Such a check valve 14 is tubular in construction has a wall portion 45, inside of which is disposed a restrictive opening 47 that in one embodiment comprises a ring having a circular opening, which ring is annularly disposed about and in contact with the interior of the wall portion 45 such that any fluid, including air, which is to pass from the ambient air side, labeled A, to the engine side E of the check valve 14 must pass through the restrictive opening 47, in the absence of a main body portion 43. The restrictive opening 47 is contoured and adapted to receive in sealing engagement the main body 43 portion, which itself includes an open restrictive orifice 48 disposed therethrough, sufficient to enable air to be drawn through the check valve 14 as a whole, from the ambient side A to the engine side E, even in the case where the outer contours of the main body 43 completely seal the restrictive opening 47. In one embodiment, the main body 43 is mechanically biased towards the engine side E, by means of a spring affixed to both the main body 43 and the wall portion 45. Thus, the check valve 14 may be thought of as being a poppet valve 24, wherein the main body portion 43 (the poppet) includes an open restrictive orifice 48 passing from the engine side E to the ambient side A even when the outer contour of the main body portion 43 is seated against the restrictive opening 47 sufficiently to close the restrictive opening 47. Accordingly, in one embodiment such a check valve is a flow restriction device which comprises a poppet valve 44 which includes a poppet, which poppet itself includes an open restrictive orifice which enables some air to flow through said poppet even when the poppet is in a closed position with respect to the restrictive opening in the interior of the flow restriction device that the poppet as a whole closes off by virtue of its movement.

In one embodiment, the open restrictive orifice 48 has an internal diameter of about one millimeter; however, orifices of any internal diameter in the range of between about 0.2 and about five millimeters, including all diameters and ranges of diameters therebetween, or more are suitable for use herein provided that a substantially reduced pressure versus ambient is effected within the engine's crankcase by the presence of such check valve 14 as described herein versus an identical engine not so equipped. In one embodiment the substantially reduced pressure is any pressure between about 50 kPa and about 100 kPa, absolute, including all pressures and ranges of pressures therebetween. Check valves 14 and control valves 35 having any one of other various known configurations are useful in accordance with this disclosure, as such are known in the art, provided that they comprise an orifice as herein described, the inner diameter of which may vary for a given engine application depending, inter alia, on such factors as engine displacement, condition of the piston ring/cylinder wall seal, how the engine is generally operated, and the average ambient climate.

Inclusion of a check valve 14 as described provides a reduced pressure to exist in the engine's crankcase. This reduced pressure condition allows the oil contaminants, and particularly water, to boil out of the lubricating oil 33 at lower oil temperatures in comparison to engines equipped with known PCV systems. The open restrictive orifice 48 serves to regulate the flow rate of the fresh air through the system and also prevents the extremely low levels of pressure normally found in the intake manifold from occurring in the crankcase. When an engine is operated in accordance with this disclosure at high RPM and high load, a surge of blow-by gas in the crankcase is caused to exist and check valve 14 permits reverse-flow of this surge of blow-by gas to the intake manifold via the air cleaner 3, which typically comprises a sealed housing, as is known in the art. During such conditions of reverse-flow of blow-by gases, the check valve is open, i.e., the outer contour of the main body portion 43 is not seated on the restrictive opening 47, the surge of blow-by gases resulting from high RPM/high load operation are delivered to the air cleaner housing and are drawn into the engine through the throttle body 7.

Road tests have been performed on vehicles provided with a crankcase ventilation system according to the present disclosure (the test vehicle) versus an identical vehicle with an engine of the same design, configuration, displacement, production run, and lubricating oil which was equipped with a PCV system in accordance with FIG. 1 (the control vehicle). The engine in each vehicle was a 3. lL engine manufactured by General Motors Corporation. The road tests were performed under a short trip vehicle test schedule which consisted of two to three trips per vehicle per day, each trip covering a distance of about two miles, with the total mileage of each vehicle being recorded. These vehicle tests were conducted year-round on both the test vehicle and control vehicle, simultaneously, to determine the effect of ambient conditions and normal vehicle usage on engine oil physical parameters and status, including contamination and degradation, for each PCV system. The crankcase oil was sampled monthly for each vehicle and qualities of the lubricating oil samples from each crankcase were analyzed by analytical techniques as now described. Initial properties of the motor oil employed in each vehicle are specified in Table I below:

TABLE I

| Appearance | Bright and clear |
|---|---|
| Viscosity @ 40° C. | 60.7 centi-Stokes |
| Viscosity @ 100° C. | 10.4 centi-Stokes |
| Viscosity Index | 161 |
| Total Base Number | 7.1 mg KOH/g oil |
| Total Acid Number | 1.9 mg KOH/g oil |
| Phosphorous | 924 ppm |
| Zn | 1037 ppm |
| Ca | 1370 ppm |
| Mg | 249 ppm |
| Na | 262 ppm |
| B | 163 ppm |
| CCS viscosity @ −25° C. | 2840 centiPoise |
| MRV viscosity @ −130° C. | 12800 centiPoise |

The fuel used in the test vehicle and the control vehicle was Amoco® unleaded gasoline having a minimum octane rating, (R+M)/2, of 87

Figure 5:
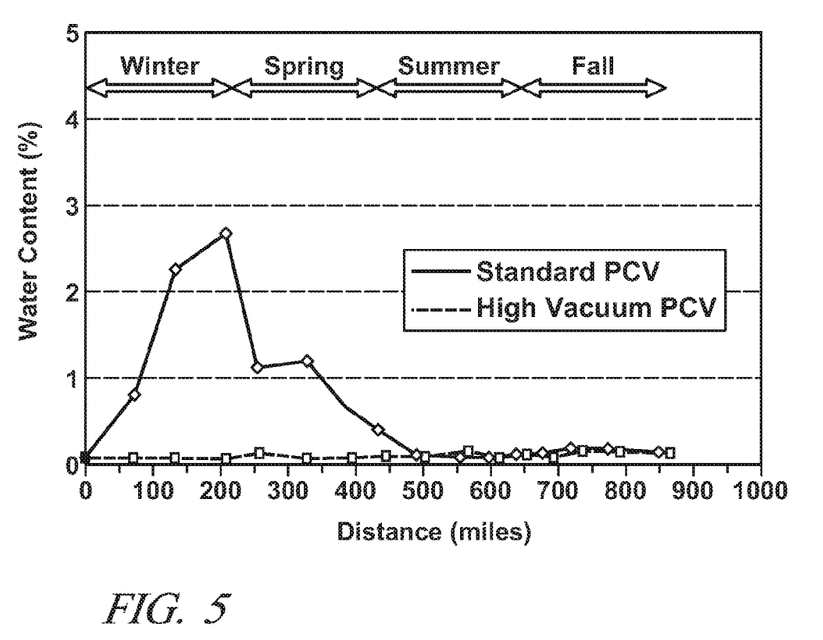
FIG. 5 is a graphical representation comparing the water content of crankcase oils of a test vehicle operated according to the instant disclosure versus a control vehicle operated according to known crankcase ventilation.

FIG. 5 shows a comparison of the water content of crankcase oils of the test vehicle and control vehicle expressed in terms of the weight percent water based on the total weight of the oil of the crankcase oil as a function of miles driven. The water content of the crankcase oils was measured by Karl Fischer titration according to ASTM D2982-93. The water content peaked at 2.7% during winter season for the control vehicle, while the water content was negligible, at less than 0.2%, for the test vehicle.

Figure 6:
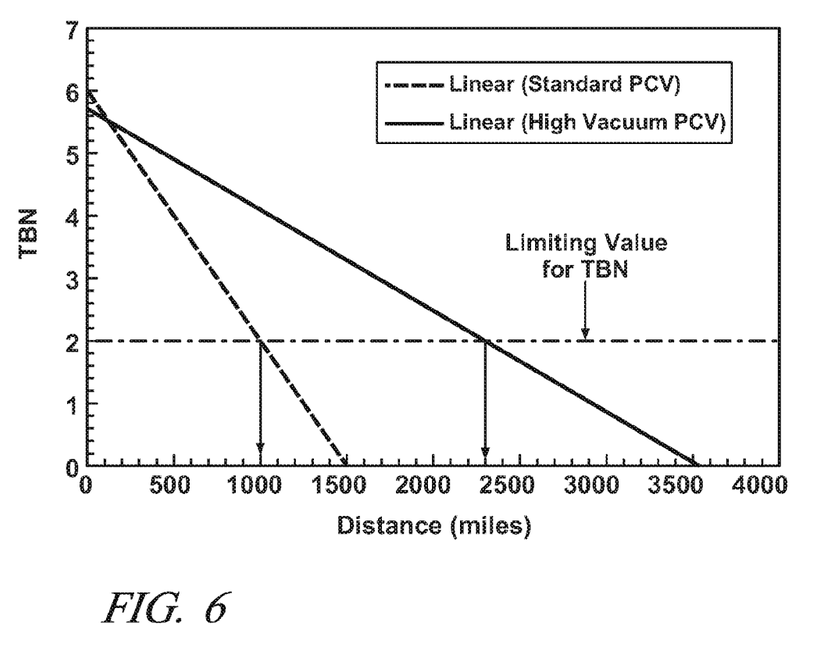
FIG. 6 is a graphical representation comparing the degradation of alkaline components of the additives present in the lubricating oil of a test vehicle operated according to the instant disclosure versus a control vehicle operated according to known crankcase ventilation.

FIG. 6 shows the degradation of alkaline components of the additives present in the control vehicle and test vehicle engine's lubricating oil as a function of miles driven, which alkaline additives typically include overbased sulfonates, in terms of the total base number (TBN) measured according to D-2896-91 and reported as milligrams of potassium hydroxide per gram of oil. The TBN generally indicates the level of overall alkalinity of the crankcase oil which protects engine from corrosion and wear by neutralizing acidic compounds generated during combustion and which enter the crankcase as blow-by gas, in addition to indicating oxidation. The lowest desirable operating limit value for the TBN is a base number of 2, which when reached indicates necessity for a change in the engine's lubricating oil. The recommended engine change interval can be estimated from the TBN degradation trend plots in FIG. 6. From this it is clear that for the control vehicle, a change of lubricating oil would be recommended after 1,000 miles of driving, while a change of lubricating oil would not be recommended for the test vehicle until after 2,300 miles of driving had occurred. Therefore, use of a system according to this disclosure is seen to have extended the length of time that the alkalinity present in the crankcase oil remains at a useful service level by a factor of about 2.3, in terms of miles driven in this test, which embodies actual conditions encountered in the field by the vast majority of passenger car vehicles currently in service.

Figure 7:
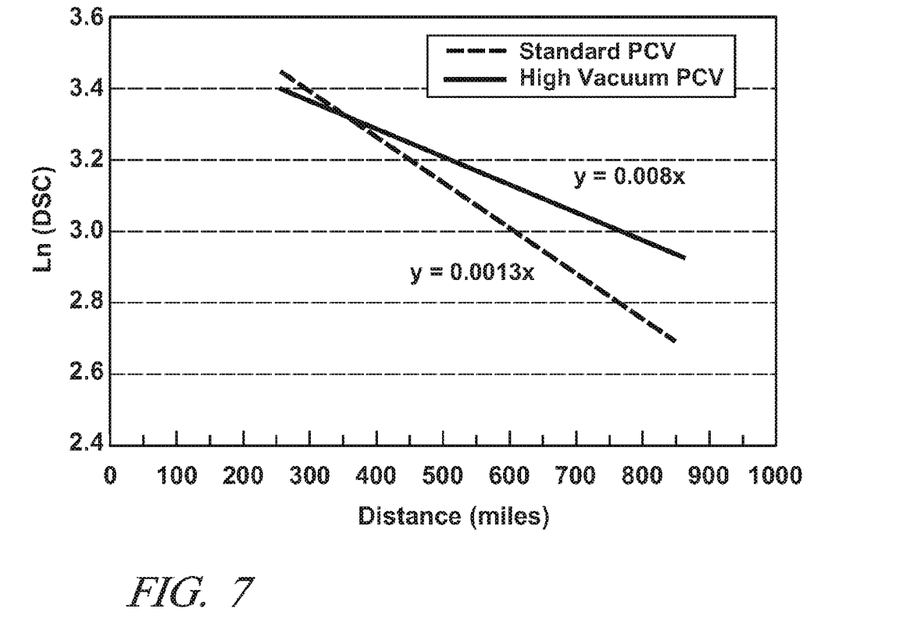
FIG. 7 is a graphical representation comparing the loss of anti-oxidant properties of the lubricating oil of a test vehicle operated according to the instant disclosure versus a control vehicle operated according to known crankcase ventilation.

FIG. 7 illustrates a comparison between the control vehicle and the test vehicle of the loss of antioxidant property, as measured by differential scanning calorimetry ("DSC") according to ASTM D5483, in a natural log plot of DSC oxidation induction time versus distance traveled. Once the oxidation induction time reaches two minutes, an oil change is recommended. The slope of the trend lines is indicative of the degradation rate of antioxidant additives in the crankcase oil, which often include alkylphenols and diphenylamines. As is evident from FIG. 7, the degradation rate is much lower for the test vehicle (slope=−0.008), versus the control vehicle (slope=−0.0013). This is further evidence that engine oil is degraded much more rapidly with known PCV systems, which therefore, and accordingly, require more frequent oil changes as compared to vehicles equipped with a system as provided herein.

Figure 8:
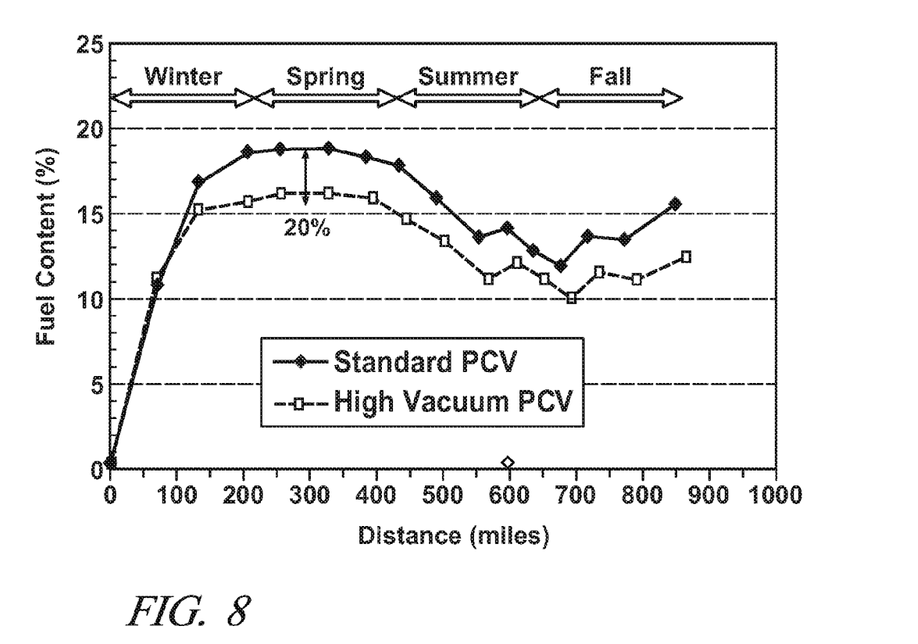
FIG. 8 is a graphical representation comparing the unburned fuel content of the lubricating oil of a test vehicle operated according to the instant disclosure versus a control vehicle operated according to known crankcase ventilation.

FIG. 8 shows a graphical comparison of the fuel content in the crankcase oils of the control vehicle versus the test vehicle. The fuel content of the crankcase oils was determined by heating a sample of the oil to 120° C. to substantially completely distill off those components present in the oil in the gasoline range, and the weight difference prior to and after distillation recorded on a mass basis relative to the total initial weight of the oil sampled. Fuel content for the test vehicle is seen to be 20% lower than that of the control vehicle. Engine oil that is diluted with unburned fuel has greatly reduced viscosity and hence lubricity, which translates to increased wear of internal engine components.

Although various orifices and openings have been described herein as being substantially circular in cross section and diameters and ranges of diameters have been specified, the present disclosure also includes the use of openings having cross-sectional diameters of geometries other than circular, provided that the total cross sectional surface are is about the same as that obtained when operating to the embodiments of this disclosure in which the openings / orifices, etc., are circular in cross section.

The words "effective fluid communication" used herein are employed in reference to air, a fluid. Two regions, spaces, or volumes are said to be in effective fluid communication if air may pass from one of such regions, spaces, or volumes to the other, whether under a pressure that is reduced from ambient or at ambient pressure. One non-limiting example is provided by the case of a conduit having two end portions, one of which is open to ambient pressure or has an air filter disposed at a first end. The second end is said to be in effective fluid communication with the first end if air may pass from the first end portion to the second end portion of the conduit. The term "conduit" as used herein does not necessarily refer solely to a pipe, hose or the like, but is any element or combination of elements which collectively have at least a first end and a second end, through which air may pass from a first end to a second end. Thus, in at least one embodiment, a conduit within the meaning of this disclosure has at least a first end portion and a second end portion which are in effective fluid communication with one another.

Although reference has been made herein to devices useful for switching, other functionally-equivalent devices are useful in accordance with the disclosure including without limitation switches having bi-metallic elements, vacuum switches used in conduction with thermally-actuated valves, and other known heat-actuated and cold-actuated switches.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A combustion engine configured for positive crankcase ventilation including a crankcase headspace and an intake plenum, said crankcase headspace fluidly coupled to atmospheric pressure through a first conduit and fluidly coupled to the intake plenum through a second conduit, the improvement comprising:
   a valve within the first conduit effective to restrict the draw of fresh air therethrough into the crankcase headspace during engine operation sufficiently to establish a high vacuum condition by reducing the pressure within the crankcase headspace below atmospheric pressure, the reduced pressure within the crankcase headspace increasing the volatility of contaminants present within the crankcase headspace and exiting through the second conduit including a positive crankcase ventilation valve, wherein said valve within the first conduit is controllably variable in response to engine temperature.

2. The combustion engine as claimed in claim 1 wherein said valve comprises a first orifice and a second orifice wherein the second orifice has an effective flow area greater than the effective flow area of the first orifice, the first orifice is effective within the first conduit to restrict the draw of fresh air when a lubricating oil is below a predetermined temperature and the second orifice is effective within the first conduit to restrict the draw of fresh air when the lubricating oil is at least the predetermined temperature, the level of pressure in the crankcase headspace when the second orifice is effective is greater than the level of pressure when the first orifice is effective.

3. A method for operating a combustion engine containing a crankcase oil and configured for positive crankcase ventilation, said method comprising:
   restricting flow of atmospheric air through a first conduit into the crankcase utilizing a valve;
   applying the valve to establish a high vacuum condition by reducing the pressure within said crankcase below atmospheric pressure, the reduced pressure within the crankcase increasing the volatility of contaminants present within the crankcase exiting through a second conduit including a positive crankcase ventilation valve; and
   varying the high vacuum condition as a function of crankcase oil temperature.

4. The method according to claim 3 wherein a first high vacuum condition is effected during engine operation before crankcase oil temperature reaches a predetermined temperature and a second high vacuum condition is effected during engine operation subsequent to crankcase oil temperature reaching said predetermined temperature, wherein said second high vacuum condition is at an absolute pressure level in excess of the absolute pressure level of said first high vacuum condition.

5. The method according to claim 3 wherein said combustion engine is a combustion engine selected from the types consisting of: spark-ignition engines and compression-ignition engines.

6. A combustion engine comprising:
   an intake plenum;
   a crankcase headspace fluidly coupled to atmospheric pressure through a first conduit and fluidly coupled to the intake plenum through a second conduit;
   a valve disposed in the first conduit restricting the draw of fresh air through the crankcase headspace during engine operation sufficiently to reduce the pressure within the crankcase headspace below atmospheric pressure, the reduced pressure within the crankcase headspace effectively increasing the volatility of contaminants exiting the crankcase headspace through the second conduit including a positive crankcase ventilation valve, wherein said valve comprises a three-way valve having two positions, wherein the first position of the three-way valve provides an opening of a different size through which ambient air may be selectively drawn than is provided by the second position of said three-way valve;
   an engine control module comprising a microprocessor having inputs and outputs;
   a temperature sensor disposed in said crankcase headspace to be in effective sensing contact with lubricating oil present in said crankcase headspace, said temperature sensor being connected to said engine control module; and
   an actuator, functionally connected to said engine control module, said actuator also being in effective mechanical contact with said three-way valve sufficiently to switch said three-way valve from the first position to the second position, in response to a temperature signal input provided by said temperature sensor to the engine control module.

7. The combustion engine according to claim 6, which, when operated, comprises within the crankcase headspace any level of pressure in the range of between about 50 kPa and about 100 kPa of pressure, absolute, including all levels and all ranges of pressures therebetween.

8. The combustion engine according to claim 6, which, when operated, comprises within the crankcase headspace any level of pressure in the range of between about 50 kPa and about 100 kPa of pressure, absolute, including all levels and all ranges of pressures therebetween.

9. The combustion engine according to claim 6 wherein the opening through which air may be drawn in said first position of said valve has a flow area equivalent to the area of a circle having a diameter in the range of between about 0.2 and about 5 millimeters, including all diameters and ranges of diameters therebetween, and wherein the opening through which air may be drawn in said second position of said valve has a flow area equivalent to the area of a circle having a diameter in the range of between about 2 to about 8 millimeters, including all diameters and ranges of diameters therebetween.

10. The combustion engine according to claim 6 wherein said actuator is caused to change the position of said three-way valve from the first position to the second position in the event that lubricating oil disposed in said crankcase headspace reaches a temperature of about 50 degrees centigrade.

11. The combustion engine according to claim 6 wherein said second conduit includes at least one element selected from the group consisting of: an air/oil separator and a PCV regulator valve.

12. The combustion engine according to claim 6 wherein said first conduit includes an air filter element.

13. The combustion engine according to claim 6 wherein said first conduit includes an air/oil separator.

* * * * *